(12) United States Patent
Mishima

(10) Patent No.: US 9,711,810 B2
(45) Date of Patent: Jul. 18, 2017

(54) EXHAUST DRAIN VALVE FOR FUEL CELL

(71) Applicant: AISIN SEIKI KABUSHIKI KAISHA, Kariya-shi (JP)

(72) Inventor: Takashi Mishima, Toyota (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 13 days.

(21) Appl. No.: 14/876,019

(22) Filed: Oct. 6, 2015

(65) Prior Publication Data
US 2016/0315340 A1 Oct. 27, 2016

(30) Foreign Application Priority Data

Apr. 24, 2015 (JP) ................................. 2015-089427

(51) Int. Cl.
| | |
|---|---|
| H01M 8/04 | (2016.01) |
| H01M 8/06 | (2016.01) |
| F16K 27/02 | (2006.01) |
| F16K 31/06 | (2006.01) |
| H01M 8/04119 | (2016.01) |
| H01M 8/0662 | (2016.01) |

(52) U.S. Cl.
CPC ....... *H01M 8/04119* (2013.01); *F16K 27/029* (2013.01); *F16K 31/0672* (2013.01); *H01M 8/0662* (2013.01); *H01M 8/04164* (2013.01); *H01M 2250/20* (2013.01); *Y02T 90/32* (2013.01)

(58) Field of Classification Search
CPC .............. H01M 8/04291; H01M 8/04; H01M 2250/20; F16K 1/32; F16K 1/00; F16K 1/52; F16K 51/00; F16K 27/029; F16K 31/0671; B60N 2/2213; B60N 2/2227; B60N 2/20; Y02T 90/32

See application file for complete search history.

(56) References Cited

FOREIGN PATENT DOCUMENTS

| JP | 2008-226805 | | 9/2008 | |
|---|---|---|---|---|
| JP | 2009-176481 | | 8/2009 | |
| JP | 2013-09224 | * | 5/2013 | ............ F16K 51/00 |
| JP | 2013-093256 | | 5/2013 | |

OTHER PUBLICATIONS

Smith (Smith ed., Valve Selection Handbook, 5th ed. Elsevier, New York © 2004—taken as December).*

* cited by examiner

*Primary Examiner* — Patrick Ryan
*Assistant Examiner* — Aaron Greso
(74) *Attorney, Agent, or Firm* — Oblon, McClelland, Maier & Neustadt, L.L.P.

(57) ABSTRACT

An exhaust drain valve includes a valve casing, a primary flow passage introducing an anode-off gas and a produced water from an inlet of the primary flow passage to an inside, a secondary flow passage discharging the anode-off gas and the produced water from an outlet of the secondary flow passage to an outside, a valve seat being formed at a primary flow passage outlet, and a valve body moving forward and backward. The primary flow passage includes an orifice being communicated with the primary flow passage outlet, an introduction flow passage having a diameter larger than a diameter of the orifice, the introduction flow passage being communicable with the inlet, and a step portion being formed orthogonal to an axial direction of the introduction flow passage, the step portion connecting the orifice and the introduction flow passage by having a step between the orifice and the introduction flow passage.

3 Claims, 6 Drawing Sheets

US 9,711,810 B2

EXHAUST DRAIN VALVE FOR FUEL CELL

CROSS REFERENCE TO RELATED APPLICATIONS

This application is based on and claims priority under 35 U.S.C. §119 to Japanese Patent Application 2015-089427, filed on Apr. 24, 2015, the entire content of which is incorporated herein by reference.

TECHNICAL FIELD

This disclosure generally relates to an exhaust drain valve for a fuel cell.

BACKGROUND DISCUSSION

A known exhaust drain valve for a fuel cell is disclosed in JP2013-093256A (hereinafter referred to as Patent reference 1). As disclosed in Patent reference 1, a primary flow passage of the exhaust drain valve for the fuel cell includes an orifice and an introduction flow passage. The orifice is communicated with a primary flow passage outlet. The introduction flow passage is formed in a tapered shape and that connects the orifice to an inlet.

According to the aforementioned exhaust drain valve for the fuel cell disclosed in Patent reference 1, when the exhaust drain valve is opened in a state where a produced water is gathered, the produced water (liquid) is drained, and at the same time, an anode off-gas (a gaseous material) flows simultaneously (gas-liquid two-phase flow). In this time, because a slug flow is generated in the primary flow passage, an abnormal noise is generated.

A need thus exists for an exhaust drain valve for a fuel cell which is not susceptible to the drawback mentioned above.

SUMMARY

According to an aspect of this disclosure, an exhaust drain valve for a fuel cell being provided at a position between an exhaust pipe being connected to an outlet of a cathode flow passage of the fuel cell and an outlet of an anode flow passage of the fuel cell, the exhaust drain valve for the fuel cell flowing and shutting off an anode-off gas and a produced water discharged from the anode flow passage, the exhaust drain valve for the fuel cell includes a valve casing, a primary flow passage being provided at the valve casing, the primary flow passage introducing the anode-off gas and the produced water from an inlet of the primary flow passage to an inside, a secondary flow passage being provided at the valve casing, the secondary flow passage discharging the anode-off gas and the produced water from an outlet of the secondary flow passage to an outside, the anode-off gas and the produced water introduced from the primary flow passage, a valve seat being formed at a primary flow passage outlet, the primary flow passage outlet serving as an outlet of the primary flow passage, and a valve body moving forward and backward relative to the valve seat, the valve body being formed with a valve portion selectively attachable to the valve seat. The primary flow passage includes an orifice being communicated with the primary flow passage outlet, an introduction flow passage having a diameter larger than a diameter of the orifice; the introduction flow passage being communicable with the inlet, and a step portion being formed orthogonal to an axial direction of the introduction flow passage, the step portion connecting the orifice and the introduction flow passage by having a step between the orifice and the introduction flow passage.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
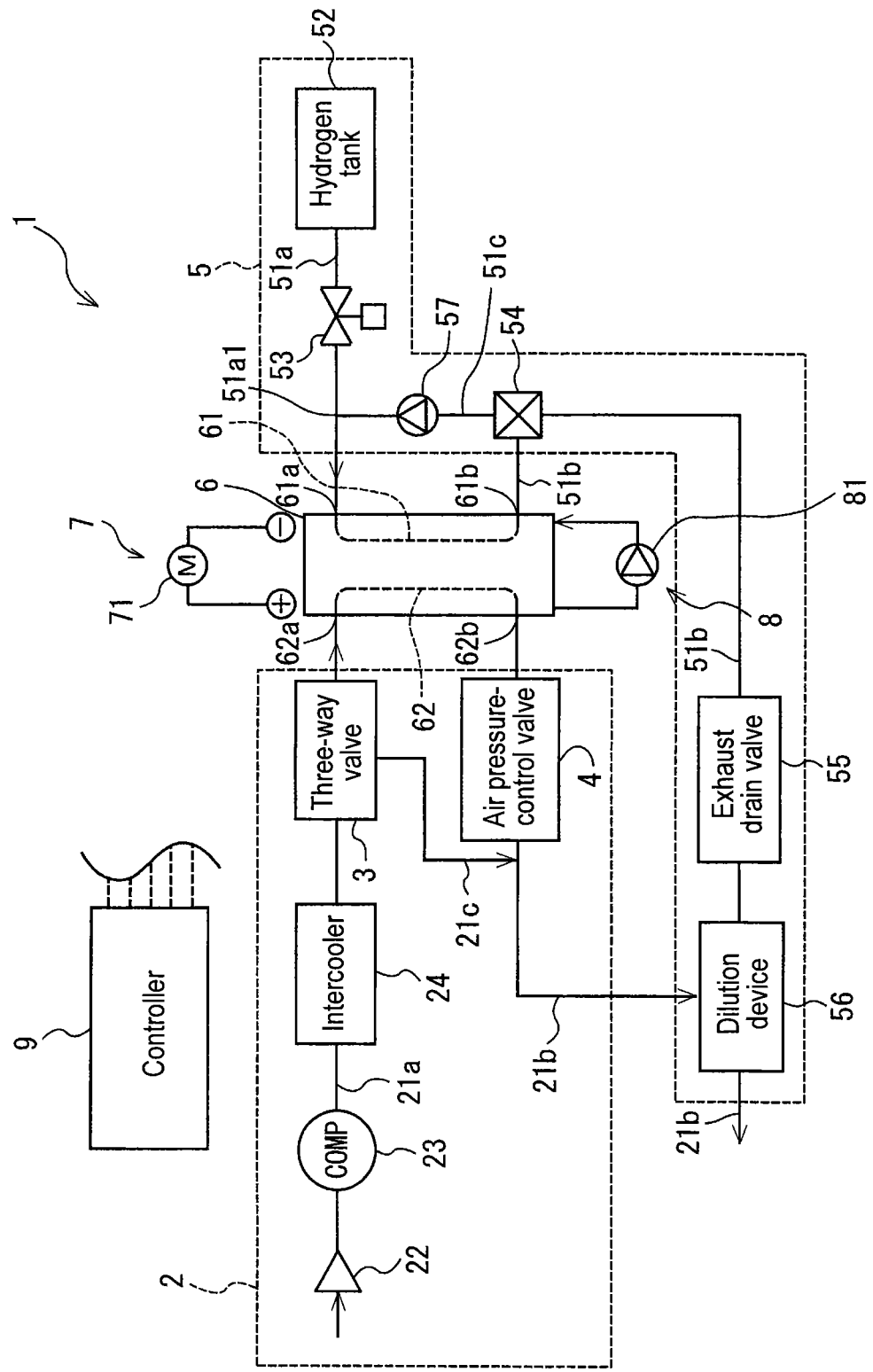
FIG. 1 is a view schematically illustrating a fuel cell system using an exhaust drain valve according to an embodiment disclosed here.

An embodiment of a fuel cell system applying an exhaust drain valve for a fuel cell of this disclosure will hereunder be explained with reference to the drawings. As shown in FIG. 1, a fuel cell system 1 includes an oxygen system 2, a fuel system, 5, a cell stack (i.e., serving as a fuel cell) 6, a power drive system 7, a cooling system 8, and a control unit 9.

The cell stack 6 is, but not limited to, formed such that plural solid polymer-type unit cells are overlapped, or piled. The plural unit cells are electrically connected with one another in series. The unit cell includes an electrolyte membrane, an anode electrode and a cathode electrode, the anode electrode and the cathode electrode that sandwich the electrolyte membrane therebetween. An anode separator of the unit cell is provided with an anode flow passage 61 for supplying a hydrogen gas to the anode electrode. A cathode separator is provided with a cathode flow passage 62 for supplying an air (an oxidant gas) to the cathode electrode. When the power of the cell stack 6 is generated, a small amount of nitrogen within an air leaks from the cathode flow passage 62 to the anode flow passage 61 through the electrolyte membrane of the unit cell. Thus, the density of the hydrogen gas within the anode flow passage 61 decreases. An exhaust drain valve 55 opens at regular intervals in order to prevent the density of the hydrogen gas within the anode flow passage 61 from decreasing.

The oxygen system 2 includes an oxygen system supply pipe 21a that is connected to an inlet 62a of the cathode flow passage 62 being positioned within the cell stack 6. An air filter 22, a compressor 23, an intercooler 24 and a three-way valve 3 are provided on the oxygen system supply pipe 21a in the aforementioned order along a direction toward the cell stack 6. The compressor 23 takes in, compresses and sends an air in the atmosphere. The intercooler 24 cools the heat of the air sent from the compressor 23. The three-way valve 3 shuts off or allows the supply of the air to the cell stack 6.

An outlet 62b of the cathode flow passage 62 is connected to a first end of an oxygen system exhaust pipe 21b (i.e., serving as an exhaust pipe). An air pressure-control valve 4 that serves as a two-port fluid control valve is provided on the oxygen system exhaust pipe 21b. Alternatively, the air pressure-control valve 4 can be a device that is configured by a shut-off valve and a backpressure-control valve being provided at an upper steam of the shut-off valve. The three-way valve 3 serves as a three-port fluid control valve. The three-way valve 3 is connected to a first end of a bypass tubular passage 21c. A second end of the bypass tubular passage 21c is connected to a downstream portion (a side where the cell stack 6 is not connected) of the oxygen system exhaust pipe 21b relative to the air pressure-control valve 4.

Meanwhile, a first end of a fuel system supply pipe 51a of the fuel system 5 is connected to a hydrogen tank 52. A pressure-control valve 53 is provided on the fuel system supply pipe 51a. The hydrogen tank 52 is provided for storing the hydrogen gas. The pressure-control valve 53 lowers the pressure level of the hydrogen tank 52 and controls the pressure level to be able to be used at the cell stack 6 (the fuel cell). A second end of the fuel system supply pipe 51a is connected to an inlet 61a of the anode flow passage 61 being positioned within the cell stack 6. An outlet 61b of the anode flow passage 61 is connected to a fuel system drain pipe 51b. A gas-liquid separation device 54 (i.e., serving as an attachment member), an exhaust drain valve 55 and a dilution device 56 are positioned on the fuel system drain pipe 51b in the aforementioned order from a side where the cell stack 6 is positioned. The fuel system drain pipe 51b corresponds to a connection tube connecting the oxygen system exhaust pipe 21b and the outlet 61b of the anode flow passage 61. Alternatively, the fuel system drain pipe 51b is positioned within a wall surface of a body 54a (see FIG. 2), the wall surface configuring a wall surface of the body 54a that configures the gas-liquid separation device 54.

Figure 2:
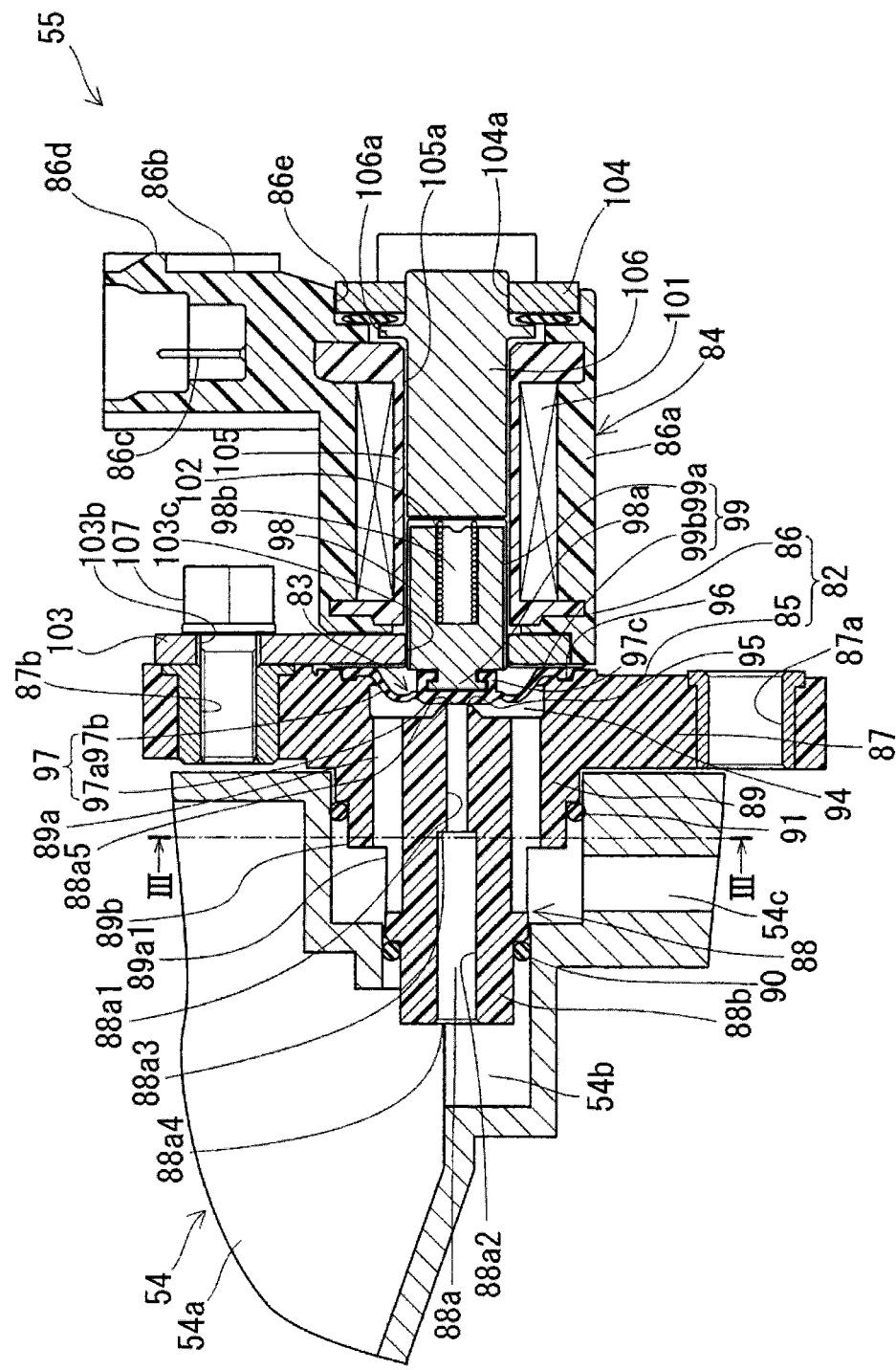
FIG. 2 is a cross-sectional view illustrating the exhaust drain valve.

The gas-liquid separation device 54 separates the produced water from the anode-off gas that is introduced from the anode flow passage 61. That is, the gas-liquid separation device 54 includes the produced water which is liquid, and the hydrogen gas which is a gaseous material. In particular, the water produced at the anode pole is formed in a water vapor form and in a mist form and is positioned at the fuel system drain pipe 51b that is positioned at an upper stream relative to the gas-liquid separation device 54. The vapor-formed produced water and the mist-formed produced water are mixed with each other and are introduced to the gas-liquid separation device 54. In the gas-liquid separation device 54, the mist-formed produced water is aggregated and the vapor-formed produced water is condensed to be the produced water which is liquid. As shown in FIG. 2, the produced water which comes to be liquid is gathered at a bottom portion of the gas-liquid separation device 54, the bottom portion facing an inlet 88a4 of a primary flow passage 88a. A first outlet 54b opening to the inlet 88a4 of the primary flow passage 88a is provided at a bottom portion of the body 54a of the gas-liquid separation device 54. A second outlet 54c opening to an outlet 89a1 of a secondary flow passage 89a is provided at the bottom portion of the body 54a of the gas-liquid separation device 54. The second outlet 54c is communicated with the dilution device 56 (see FIG. 1) via the fuel system drain pipe 51b.

As shown in FIG. 1, the gas-liquid separation device 54 is connected to a connection point 51a1 via the fuel system circulation passage 51c, the connection point 51a1 that is positioned between a pressure-control valve 53 being positioned on the fuel system supply pipe 51a and the inlet 61a of the anode flow passage 61. A circulation pump 57 is provided on the fuel system circulation passage 51c. The circulation pump 57 sends the hydrogen gas stored in the gas-liquid separation device 54 to the anode flow passage 61. Accordingly, the hydrogen gas is recirculated and is used at the anode flow passage 61 (fuel electrode). The exhaust drain valve 55 serves as an exhaust drain valve for a fuel cell that flows/shuts off the anode-off gas and the produced water discharged, or exhausted and drained from the anode flow passage 61.

The dilution device 56 is provided at a connection portion of the fuel system drain pipe 51b and the oxygen system exhaust pipe 21b. The dilution device 56 dilutes the anode-off gas transmitted from the exhaust drain valve 55 with an air sent from the oxygen system 2. Then, the diluted anode-off gas is exhausted to outside. The dilution device 56 is provided with a tubular inlet portion at an inlet portion positioned from the fuel system drain pipe 51b to the oxygen system exhaust pipe 21b. The tubular inlet portion is formed in a cylindrical shape and includes plural holes positioned through in an axial direction of the oxygen system exhaust pipe 21b. It is favorable that the tubular inlet portion includes a hole with a size of, for example, $\Phi 1.3$ millimeter (mm)×10 mm or a hole with a size of, for example, $\Phi 1.8$ mm×7 mm. For example, comparing to a hole with a diameter of, for example, $\Phi 11$, a sound pressure level in a gas-liquid two-phase flow can be reduced.

The power drive system 7 includes an electric motor 71 for driving a vehicle. The electric motor 71 is connected to a positive pole and a negative pole of the cell stack 6 and is driven in accordance with the power generation of the cell stack 6. The cooling system 8 includes a cooling pump 81 and cools the cell stack 6 by circulating the cool water within the cell stack 6. The control unit (controller) 9 is electrically connected to the compressor 23, the three-way valve 3, the air pressure-control valve 4, the exhaust drain valve 55, the pressure-control valve 53, the circulation pump 57 and the cooling pump 81. The control unit 9 controls the operations of the compressor 23, the three-way valve 3, the air pressure-control valve 4, the exhaust drain valve 55, the pressure-control valve 53, the circulation pump 57 and the cooling pump 81 in response to a desired power generation amount of the cell stack 6, the power generation amount calculated in accordance with the running state of the vehicle.

According to the aforementioned construction, when the vehicle starts up, the control unit 9 drives the compressor 23 to supply air to the cathode flow passage 62. At the same time, the control unit 9 drives the pressure-control valve 53 and the circulation pump 57 to supply the hydrogen gas to the anode flow passage 61. Then, the power generation is performed at the cell stack 6. The air including oxygen being sucked via the air filter 22 of the oxygen system 2 is compressed by the compressor 23 and is cooled by the intercooler 24. The three-way valve 3 changes the position of a valve member in response to the power generation amount of the cell stack 6. The three-way valve 3 divides the air supplied from the intercooler 24 and releases the air to the bypass tubular passage 21c. Accordingly, the three-way valve 3 controls the flow amount of the air flowing to the cell stack 6.

The air pressure-control valve 4 adjusts the opening and the exhausted amount of air remained within the cell stack 6 to control the pressure within the cell stack 6. The produced water produced in accordance with the power generation, an unused hydrogen gas and an unused nitrogen gas are drained or exhausted via the exhaust drain valve 55. The dilution device 56 dilutes the hydrogen gas exhausted via the exhaust drain valve 55 with the air supplied from the oxygen system exhaust pipe 21b. Then, the hydrogen gas is exhausted to outside with water.

The structure of the exhaust drain valve 55 will hereunder be explained. The primary flow passage 88a is positioned in a lateral manner or in a horizontal manner in a case where the exhaust drain valve 55 is in a mounted state or is mounted to, for example, the vehicle. In particular, the exhaust drain valve 55 is mounted to the gas-liquid separation device 54 such that a center axis of the primary flow passage 88a is positioned in a lateral manner or in a horizontal manner. As shown in FIG. 2, the exhaust drain valve 55 includes a valve casing 82, a valve mechanism 83, and a valve body operation device 84 driving the valve mechanism 83.

The valve casing 82 includes a body portion 85 and a cover portion 86. The body portion 85 is made of polyphenylene sulfide resin being filler-reinforced with, for example, a glass fiber. The body portion 85 includes a flange portion 87, a first gas-liquid distribution portion 88 and a second gas-liquid distribution portion 89. The flange portion 87 is fixed to the body 54a of the gas-liquid separation device 54 by, for example, a bolt. The first gas-liquid distribution portion 88 is formed in a tubular shape and protrudes in a direction orthogonal to a longitudinal direction of the flange portion 87. The second gas-liquid distribution portion 89 being formed in a tubular shape protrudes from the flange portion 87 and is positioned at a circumference of the first gas-liquid distribution portion 88. The second gas-liquid distribution portion 89 protrudes from the flange portion 87. A distal end (in a left direction in FIG. 2) of the second gas-liquid distribution portion 89 is provided with an outer circumference of the first gas-liquid distribution portion 88 such that a step portion is provided between the second gas-liquid distribution portion 89 and the first gas-liquid distribution portion 88.

Figure 3:
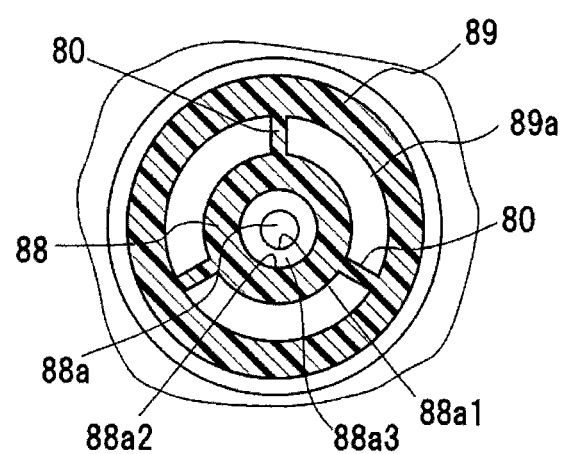
FIG. 3 is a cross-sectional view taken along line in FIG. 2.

A distal end of the first gas-liquid distribution portion 88 is formed with a cylindrical first engagement portion 88b. A step portion surrounded at a base end portion of the first engagement portion 88b is provided with a first shaft seal member 90 (for example, an O ring) that surrounds the outer circumference of the base end portion of the first engagement portion 88b. The distal end of the second gas-liquid distribution portion 89 is formed with a cylindrical second engagement portion 89b. A step portion surrounded at a base end portion of the second engagement portion 89b is provided with a second shaft seal member 91 (for example, an O ring) that surrounds the outer circumference of the base end portion of the second engagement portion 89b. As shown in FIG. 3, the first and second gas-liquid distribution portions 88, 89 are fixed with each other by a support wall 80 that extends in a direction orthogonal to the protruding direction of the first gas-liquid distribution portion 88.

Flow passages connecting the cell stack 6 (the fuel cell) and an outside of the vehicle include the primary flow passages 88a, the secondary flow passages 89a and the valve body 97. The first gas-liquid distribution portion 88 is formed with the primary flow passage 88a being communicated with the gas-liquid separation device 54. The primary flow passage 88a is provided at the valve casing 82 and introduces the anode-off gas and the produced water from the inlet 88a4 of the primary flow passage 88a to an inside of the primary flow passage 88a. The primary flow passage 88a is provided with an orifice 88a1, an introduction flow passage 88a2, and a step portion 88a3. The orifice 88a1 is communicated with a primary flow passage outlet 88a5. The introduction flow passage 88a2 includes a diameter larger than a diameter of the orifice 88a1 and is communicable with the inlet 88a4. The introduction flow passage 88a2 has the diameter that is constant along an entire length of the introduction flow passage 88a2. The step portion 88a3 connects the orifice 88a1 and the introduction flow passage 88a2 by having a step between the orifice 88a1 and the introduction flow passage 88a2.

The step portion 88a3 has an inclination that is in parallel with a flat surface orthogonal to an axial direction of the primary flow passage 88a. That is, the step portion 88a3 is formed orthogonal to an axial direction of the introduction flow passage 88a2. Alternatively, it is favorable that the step portion 88a3 has the inclination that is tilted, or inclined by a predetermined angle relative to the flat surface orthogonal to the axial direction of the primary flow passage 88a. It is favorable that the predetermined angle is, for example, equal to or less than 10 degrees.

It is favorable that an inner diameter of the orifice 88a1 is set at a range of 1.4 mm to 2.0 mm. It is favorable that the length of the orifice 88a1 is set at a range of 10 mm to 20 mm. It is favorable that an inner diameter of the introduction flow passage 88a2 is set at a range of 3.0 mm to 4.5 mm. It is further favorable that the inner diameter of the orifice 88a1 is set at a range of 1.8 mm to 1.9 mm. It is further favorable that length of the orifice 88a1 is set at 12 mm. It is further favorable that the inner diameter of the introduction flow passage 88a2 is set at a range of 3.5 mm to 3.8 mm.

Alternatively, the primary flow passage 88a can be formed such that the introduction flow passage 88a2 serves as a flow passage including a step portion. In this case, a diameter of a first flow passage positioned at a side where the inlet 88a4 is positioned is larger than a diameter of a second flow passage positioned at a side where the orifice 88a1 is positioned. Alternatively, the diameter of the first flow passage can be smaller than the diameter of the second flow passage. In this case, a step portion is formed in a same manner as the step portion 88a3.

As shown in FIG. 3, the second gas-liquid distribution portion 89 is formed with the plural secondary flow passages 89a (three in the embodiment) being communicated with the dilution device 56. The secondary flow passages 89a are provided at the valve casing 82. The secondary flow passages 89a flow the anode-off gas and the produced water introduced from the primary flow passage 88a to an outside of the secondary flow passage 89a via the outlets 89a1. The cross section of the secondary flow passage 89a is formed in a fan shape or in an arc shape. Alternatively, the cross section of the secondary flow passage 89a is formed in a circular shape. In this case, it is favorable that the plural secondary flow passages 89a are provided in a circumferential direction and are positioned by a predetermined interval.

A valve housing portion 94 is provided at the base end portion of the first gas-liquid distribution portion 88. A first end surface of the valve housing portion 94 (in a right direction in FIG. 2) is open and is recessed at a center portion of the flange portion 87. The primary flow passage 88a is open at a center portion of the valve housing portion 94. The secondary flow passage 89a is open at a circumference of the opening of the primary flow passage 88a. An opening rim of the primary flow passage 88a protrudes to a side where the valve housing portion 94 is positioned so as to be tapered toward inner side to include a smaller diameter. An annular valve seat 95 is provided at the primary flow passage outlet 88a5. A fixing groove 96 fixing a circumferential end portion of a diaphragm portion 97b of a valve body 97 is provided at a circumferential end surface of the valve housing portion 94.

An attachment hole 87a and a mounting hole 87b are provided at a circumferential end of the flange portion 87.

The attachment hole 87a is for mounting the flange portion 87 to the gas-liquid separation device 54. The mounting hole 87b is for mounting a support plate 103 to the flange portion 87. Female screws that are made of metal are positioned through the respective circumferences of the attachment hole 87a and the mounting hole 87b.

The cover portion 86 is made of, for example, nylon resin, and is provided with a cylinder portion 86a that is formed in a cylindrical shape. A connector support portion 86b configuring a connector protrudes from a distal end portion of the cylinder portion 86a in a direction orthogonal to a longitudinal direction of the cover portion 86. A terminal 86c being connected to a solenoid 101 is provided at the connector support portion 86b. The connector support portion 86b is provided with a retaining pawl 86d that removably retains a socket. A guide groove 86e being fitted with a support band body 104 in a direction orthogonal to a mounting direction of the connector support portion 86b is formed at a distal end portion of the cover portion 86.

The valve mechanism 83 is mainly provided with the valve body 97, a plunger 98 serving as a valve shaft and the valve seat 95. The valve body 97 is made of, for example, rubber, and includes a valve portion 97a, the diaphragm portion 97b and a retaining portion 97c. The valve portion 97a selectively separates from the valve seat 95. The diaphragm portion 97b is integrally formed with the valve portion 97a at a circumference of the valve portion 97a. The retaining portion 97c is formed at a backside of the valve body 97a. The valve body 97 is housed in the valve housing portion 94. A circumferential rim of the diaphragm portion 97b is fitted and fixed to the fixing groove 96. The valve housing portion 94 being positioned at a side where the respective openings of the primary flow passage 88a and of the secondary flow passage 89a are positioned is air-tightly separated from external air.

The plunger 98 serves as a magnetic body that is made of, for example, ferrite stainless and is formed in a cylindrical shape. A retained pawl 98a being retained by the retaining portion 97c of the valve body 97 is provided at a first end portion of plunger 98, the first end portion positioned at a side where the valve body 97 is positioned. A second end portion of the plunger 98, the second end portion positioned at a side opposite to the valve body 97, includes a spring housing recess 98b that is recessed in an axial direction of the plunger 98. A spring member 102 is housed in the spring housing recess 98b. The plunger 98 serves as a needle of the valve body operation device 84.

The valve body operation device 84 is provided with, for example, the plunger 98, a sleeve 99, a core member 106, the solenoid 101 and a yoke member. The sleeve 99 guides the plunger 98. The sleeve 99 is made of, for example, austenitic stainless steel that is a non-magnetic body. The sleeve 99 includes a guide portion 99a and a mounting flange portion 99b. The guide portion 99a is formed in a bottomed cylindrical shape. The mounting flange portion 99b is positioned at an opening end portion of the guide portion 99a and extends outwardly in a radial direction orthogonal to the axial direction of the guide portion 99a. The mounting flange portion 99b is provided to be close contact with a circumferential rim of the valve housing portion 94 via the diaphragm portion 97b of the valve body 97. The plunger 98 being fixed with the valve body 97 is slidably provided at the guide portion 99a. The valve portion 97a of the valve body 97 is selectively separated from the valve seat 95. Because a distal end portion of the spring member 102 being compressed and housed in the housing recess 98b is in contact with a bottom portion of the sleeve 99, and because a base end portion of the spring member 102 is in contact with a bottom portion of the spring housing recess 98b, the spring member 102 biases the plunger 98 and the valve body 97 toward the valve seat 95.

The sleeve 99 is fixed to the body portion 85 with the bolt 107 via the support plate 103. The support plate 103 is made of, for example, electromagnetic stainless steel that is a magnetic body. The support plate 103 includes a support hole, a mounting hole 103b and a through hole 103c. The support hole supports the support band body 104. The mounting hole 103b mounts the support plate 103 to the body portion 85. The guide portion 99a of the sleeve 99 is positioned in the through hole 103c.

The solenoid 101 is wound with a bobbin 105 that includes an operation hole 105a in which the bobbin 105 is positioned. End portions of the positive pole and the negative pole of the solenoid 101 are connected to a power supply. A predetermined amount of a current is applied to the respective end portions of the positive pole and the negative pole of the solenoid 101 by a command of the control unit 9. The solenoid 101 and the bobbin 105 are integrally formed and are positioned at an inner circumferential wall portion of the cover portion 86. The guide portion 99a of the sleeve 99 is positioned through the operation hole 105a of the bobbin 105 from a first end of the operation hole 105a (a side where the valve body 97 is positioned). A cylindrical core member 106 is positioned through the operation hole 105a of the bobbin 105 from a second end of the operation hole 105a.

The core member 106 is made of, for example, ferrite stainless that is a magnetic body. A distal end portion of the core member 106, the distal end portion being positioned in the operation hole 105a is in contact with a bottom portion of the sleeve 99. A base end portion of the core member 106 (right end in FIG. 2) is provided with a retaining flange 106a that is retained at an end rim of the operation hole 105a of the bobbin 105. The base end portion of the core member 106 is supported and fixed with the support band body 104 that is bent to be formed in a C shape.

The support band body 104 is made of, for example, electromagnetic stainless steel that serves as a magnetic body. A center portion of the support band body 104 including an opposing ends that are bent at a right angle includes a fit-in hole 104a into which the base end portion of the core member 106 is fitted. The support band body 104 includes an engagement structure in which the support band body 104 is engaged with the support plate 103. At this time, being sandwiched by the support plate 103 and the support band body 104, the cover portion 86 and the core member 106 are mounted to be fixed to the body portion 85. The support plate 103 and the support band body 104 serve as yokes that prevent magnetic field lines from being leaked out.

Next, an operation of the exhaust drain valve 55 that is constructed as above will be explained. As shown in FIG. 2, when the solenoid 101 is in a de-energized state, the plunger 98 and the valve body 97 are biased by the spring member 102 in a direction where the valve seat 95 is positioned. Thus, the valve portion 97a of the valve body 97 is in contact with the valve seat 95. The circulation between the primary flow passage 88a and the valve housing portion 94 where the secondary flow passage 89a is open is in a disconnected state by the valve body 97a. That is, the exhaust drain valve 55 is in a valve closing state where the primary flow passage 88a and the secondary flow passage 89a are in the disconnected state. Meanwhile, the pressure level of the primary flow passage 88a is higher than the pressure level of the secondary flow passage 89a. For example, the pressure level difference ranges from approximately 30 kilopascal (kPa) to 200 kPa.

A reservoir water stored in the gas-liquid separation device 54 is calculated by an operation state of the fuel cell (for example, power output and power generating time). When the amount of the reservoir water comes to be at a predetermined reservoir water amount (a predetermined amount of water), the exhaust drain valve 55 opens. That is, the control unit 9 controls the solenoid 101 to be in an energized state by applying a current to the solenoid 101. Then, the control unit 9 controls the core member 106 to generate a magnetic force in a direction in which the plunger 98 is attached or is absorbed to the core member 106. Thus, the plunger 98 moves within the sleeve 99 against the biasing force of the spring member 102 and is attached or is absorbed to a side where the core member 106 is positioned. The valve body 97 comes to be away from the valve seat 95. The primary flow passage 88a and the secondary flow passages 89a communicate with each other. The produced water and the hydrogen gas positioned at the primary flow passage 88a flow to the secondary flow passage 89a. The produced water flows to the secondary flow passage 89a and is drained by the pressure of the anode-off gas that is positioned within the gas-liquid separation device 54.

Specifically, in a case where the exhaust drain valve 55 opens in a state where the produced water is gathered, the produced water (liquid) is drained and the anode-off gas (gas) flows at the same time (gas-liquid two-phase flow). At this time, because the primary flow passage 88a includes the step portion 88a3 that connects the orifice 88a1 and the introduction flow passage 88a2 by having the step between the orifice 88a1 and the introduction flow passage 88a2, an annular flow instead of a slug flow is generated when the anode-off gas (gas) and the produced water flow (gas-liquid two-phase flow). That is, when the exhaust drain valve 55 is opened, the slug flow is prevented from being generated. Thus, the abnormal sound may be prevented from being generated. Meanwhile, the slug flow corresponds to a flow that pulses in a wave form. The annular flow corresponds to an annular flow in which a liquid includes a constant thickness along an inside wall of a pipe.

Figure 4:
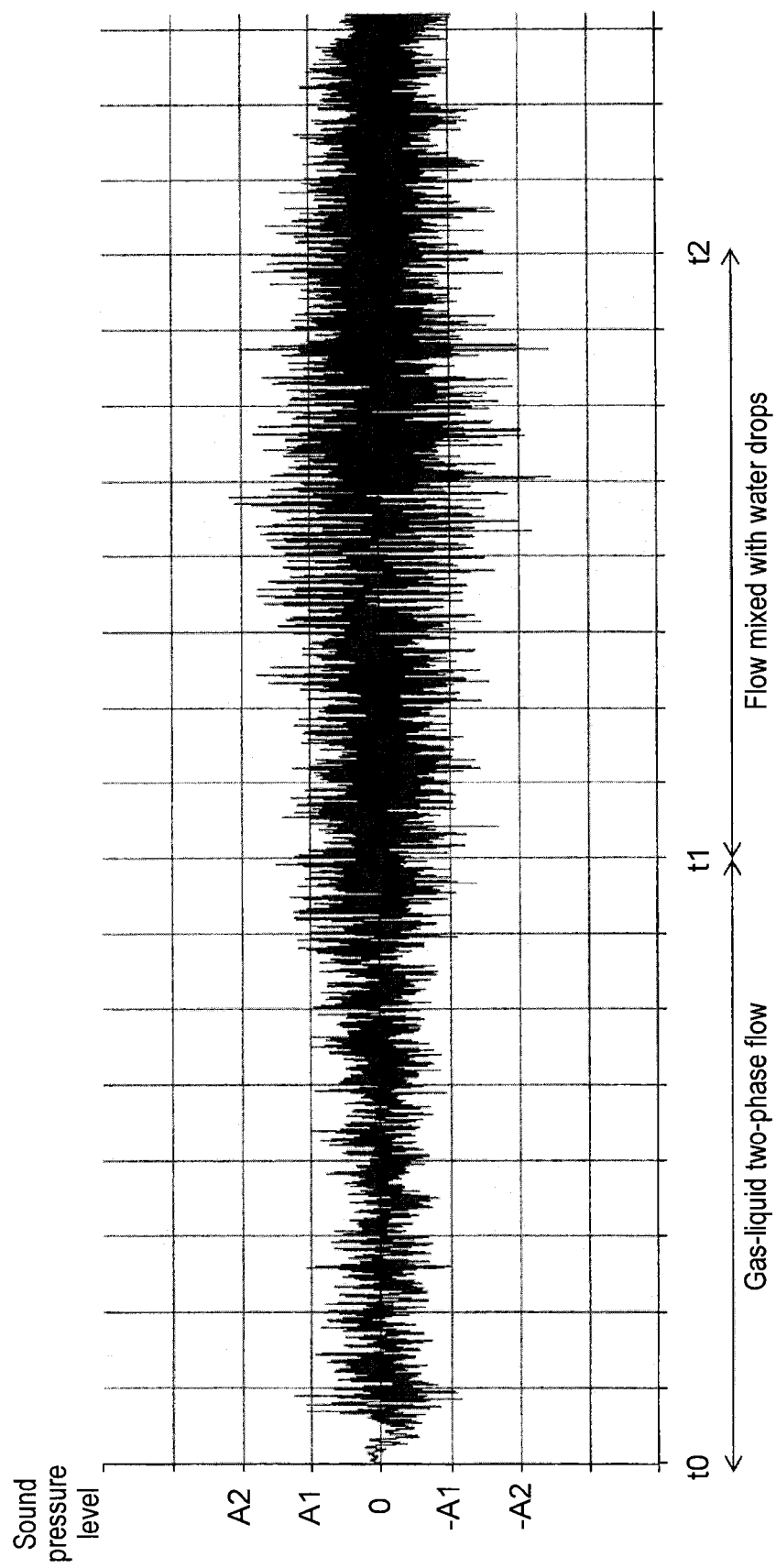
FIG. 4 is an experimental data showing an effect of the exhaust drain valve according to the embodiment.

An experimental data (sound pressure measurement data) when the exhaust drain valve 55 is opened will be shown in FIG. 4. A longitudinal axis indicates a sound pressure level and a lateral axis indicates a time. The experimental data shows the gas-liquid two-phase flow from a time t0 when the exhaust drain valve 55 is opened to a time t1 (before the drain is completed). The experimental data further shows a flow mixed with water drops (water drops are mixed with the flow after the drain is completed) in which the water drops are mixed with the flow from the time t1 to a time t2. In this experiment, an amount of wastewater corresponds to a predetermined amount (for example, 5 milliliter). The experiment reproduces a state before the drain from the gas-liquid separation device 54 is completed. The wastewater for the experiment is previously stored in the gas-liquid separation device 54. As is clear from FIG. 4, because the annular flow is generated in the gas-liquid two-phase flow from the time t0 when the exhaust drain valve 55 is opened to the time t1, the sound pressure level ranges from A1 to −A1. The sound pressure merely pulses, or if pulses, an amount of the sound pressure level is suppressed to be low.

Figure 5:
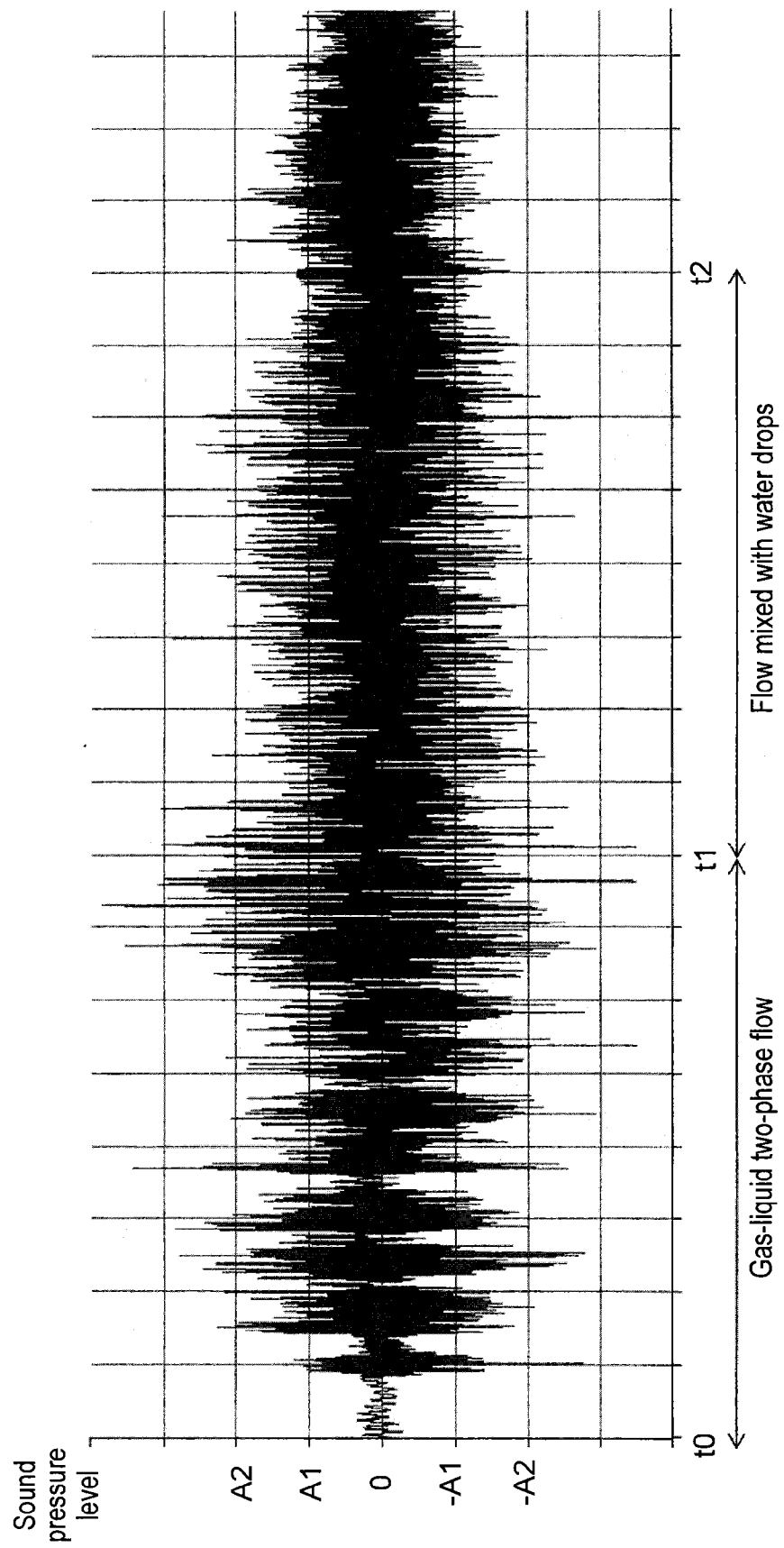
FIG. 5 is an experimental data showing an effect of an exhaust drain valve according to a comparative example.

An experimental data of a known exhaust drain valve will be shown in FIG. 5 as a comparative example. The wastewater corresponds to a predetermined amount (for example, 5 milliliter). As shown in Patent reference 1, according to a primary flow passage of the comparative example, an introduction flow passage is formed in a tapered shape being tapered from an inlet to an orifice. A step portion that is formed orthogonal to the axial direction of the introduction flow passage is not provided between the introduction flow passage and the orifice. As is clear from FIG. 5, because a slug flow instead of an annular flow is generated in a gas-liquid two-phase flow from the time t0 when the exhaust drain valve is opened to the time t1, the sound pressure level may be out of the range from A2 to −A2. The sound pressure pulses largely. A2 is larger than A1. −A2 is smaller than −A1.

As such, according to the disclosure, when the exhaust drain valve 55 is opened, and when the wastewater starts running (the gas-liquid two-phase flow state) from the time t0 when the exhaust drain valve 55 is opened to the time t1, the sound pressure level is reduced to the range from A1 to −A1 comparing to the comparative example of the experimental data showing that the sound pressure level exceeds a range from A2 to −A2.

Optimal values of a length of the orifice 88a1 and of an inner diameter of the introduction flow passage 88a2 will be explained. The inner diameter of the orifice 88a1 is set in accordance with a predetermined (preset) flow amount of the wastewater that is to be drained when the exhaust drain valve 55 is opened at one time, in accordance with a predetermined (preset) time for opening the valve, and in accordance with a pressure level difference at the orifice 88a1. For example, in a case where the predetermined amount discharged, or exhausted and drained is approximately 40 normal liter per minute (NL/min) (gaseous air), the time for opening the valve is approximately 1.5 seconds and the pressure difference level is 33 kPa, it is favorable that an inner diameter of the orifice 88a1 is set at a range of 1.4 mm to 2.0 mm. It is further favorable that the inner diameter of the orifice 88a1 is set at a range of 1.8 mm to 1.9 mm. For example, in a case where the inner diameter of the orifice 88a1 is set at 2.5 mm or larger, the flow amount comes to be larger than the predetermined flow amount or a low frequency sound comes to be large even if the sound pressure level in the gas-liquid two-phase flow can be low. On the other hand, in a case where the inner diameter of the orifice 88a1 is set at 1.2 mm or smaller, the sound pressure level in the gas-liquid two-phase flow can be low, however, the flow amount comes to be lower than the predetermined amount.

Figure 6:
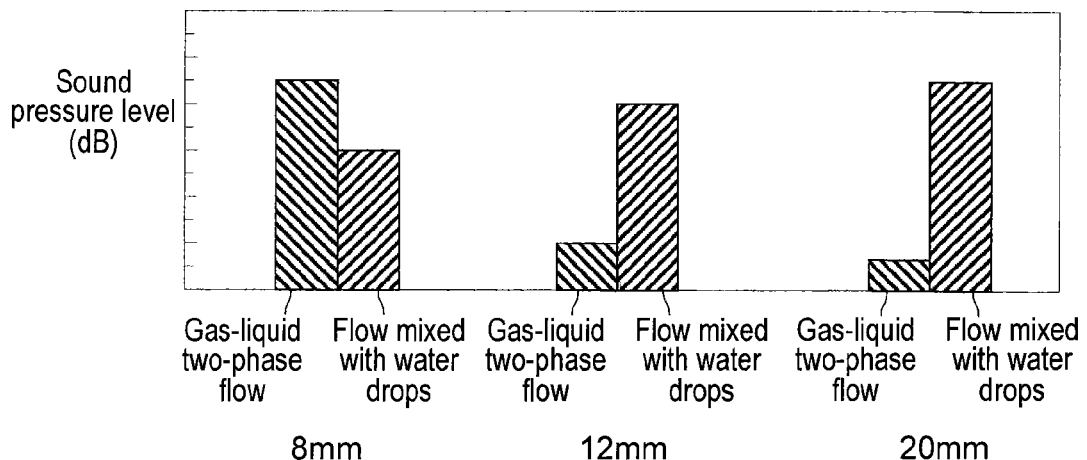
FIG. 6 is an experimental data in a case where a length of an orifice is changed.

It is favorable that the length of the orifice 88a1 is set at a range of 10 mm to 20 mm. Similarly to the experimental data shown in FIG. 4, an experimental data when the exhaust drain valve 55 is opened with the change of the length of the orifice 88a1 is obtained and is shown in FIG. 6. The inner diameter of the orifice 88a1 is 1.85 mm. The inner diameter of the introduction flow passage 88a2 is 3.8 mm.

As shown in FIG. 6, data of the orifices 88a1 with the lengths of 8 mm, 12 mm and 20 mm are shown in the aforementioned order from the left. The respective sound pressure levels (peak value) of the gas-liquid two-phase flow and of the flow mixed the water drops are shown per length (8 mm, 12 mm, 20 mm) of the orifice 88a1. The sound pressure levels of the orifice 88a1 with the lengths of 8 mm, 12 mm, and 20 mm are smaller when comparing to the known exhaust drain valve shown in FIG. 5. The longer the length of the orifice 88a1 is, the smaller the sound pressure level in the gas-liquid two-phase flow can be. On the other hand, the longer the length of the orifice 88a1 is, the greater the sound pressure level in the flow mixed with the water drops comes to be. As a result, it is favorable that the length of the orifice 88a1 is set at a range of 10 mm to 20 mm. Considering the balance of the gas-liquid two-phase flow and the flow mixed with the water drops, it is favorable that the length of the orifice 88a1 is set at 12 mm.

Figure 7:
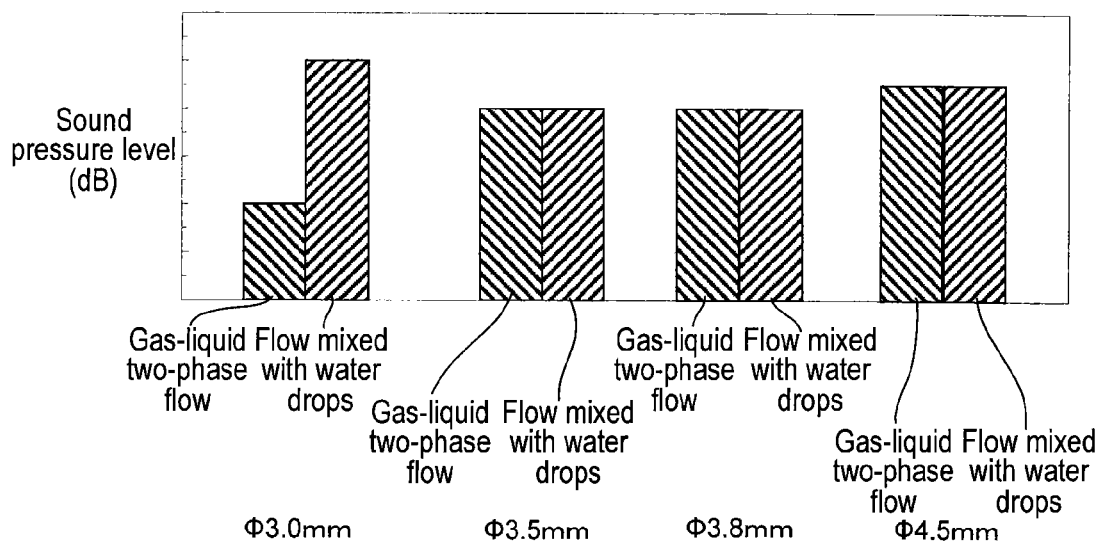
FIG. 7 is an experimental data in a case where an inner diameter of an introduction flow passage is changed.

It is favorable that the inner diameter of the introduction flow passage 88a2 is set at a range of 3 mm to 4.5 mm. Similarly to the experimental data shown in FIG. 4, the experimental data when the exhaust drain valve 55 is opened with the change of the inner diameter of the introduction flow passage 88a2 is shown in FIG. 7. The inner diameter of the orifice 88a1 is 1.85 mm. The length of the orifice 88a1 is 12 mm.

As shown in FIG. 7, data of the introduction flow passages 88a2 with the inner diameters of 3.0 mm, 3.5 mm, 3.8 mm and 4.5 mm are shown in the aforementioned order from the left. The respective sound pressure levels (peak value) of the gas-liquid two-phase flow and of the flow mixed with the water drops are shown per inner diameter (3.0 mm, 3.5 mm, 3.8 mm, 4.5 mm) of the introduction flow passage 88a2. The smaller the inner diameter of the introduction flow passage 88a2 is, the smaller the sound pressure level in the gas-liquid two-phase flow can be. On the other hand, the smaller the inner diameter of the introduction flow passage 88a2 comes to be or the larger the inner diameter of the introduction flow passage 88a2 comes to be, the larger the sound pressure level in the flow mixed with the water drops comes to be with the lowest sound pressure level of the introduction flow passage 88a2 with the inner diameter of 3.5 mm or 3.8 mm. As a result, it is favorable that the inner diameter of the introduction flow passage 88a2 is set at a range of 3 mm to 4.5 mm, especially, at a range of 3.5 mm to 3.8 mm.

According to the aforementioned embodiment, the exhaust drain valve (55) for the fuel cell (the cell stack 6) being provided at the position between the exhaust pipe (21b) being connected to the outlet (62b) of the cathode flow passage (62) of the fuel cell (the cell stack 6) and the outlet (61b) of the anode flow passage (61) of the fuel cell (the cell stack 6), the exhaust drain valve (55) for the fuel cell (the cell stack 6) flowing and shutting off the anode-off gas and the produced water discharged from the anode flow passage (61), the exhaust drain valve (55) for the fuel cell (the cell stack 6) includes the valve casing (82), the primary flow passage (88a) being provided at the valve casing (82), the primary flow passage (88a) introducing the anode-off gas and the produced water from the inlet (88a4) of the primary flow passage (88a) to the inside, the secondary flow passage (89a) being provided at the valve casing (82), the secondary flow passage (89a) discharging the anode-off gas and the produced water, the anode-off gas and the produced water introduced from the primary flow passage (88a) from the outlet (89a1) of the secondary flow passage (89a) to the outside, the valve seat (95) being formed at the primary flow passage outlet (88a5), the primary flow passage outlet (88a5) serving as the outlet of the primary flow passage (88a), and the valve body (97) moving forward and backward relative to the valve seat (95), the valve body (97) being formed with the valve portion (97a) selectively attachable to the valve seat (95). The primary flow passage (88a) includes the orifice (88a1) being communicated with the primary flow passage outlet (88a5), the introduction flow passage (88a2) having the diameter larger than the diameter of the orifice (88a1), the introduction flow passage (88a2) being communicable with the inlet (88a4), and the step portion (88a3) being formed orthogonal to the axial direction of the introduction flow passage (88a2), the step portion (88a3) connecting the orifice (88a1) and the introduction flow passage (88a2) by having the step between the orifice (88a1) and the introduction flow passage (88a2).

Accordingly, because the primary flow passage 88a includes the step portion 88a3 that connects the orifice 88a1 and the introduction flow passage 88a2 by having the step between the orifice 88a1 and the introduction flow passage 88a2, the annular flow instead of the slug flow can be generated in a case where the anode-off gas (gas) and the produced water flow (gas-liquid two-phase flow). That is, when the exhaust drain valve 55 is opened, the slug flow is prevented from being generated. Thus, the abnormal sound is prevented from being generated.

According to the aforementioned embodiment, the primary flow passage (88a) is positioned in a lateral manner in a case where the exhaust drain valve (55) for the fuel cell (the cell stack 6) is in the mounted state.

Accordingly, even if the exhaust drain valve 55 is positioned in a lateral manner or in a horizontal manner in which especially the slug flow tends to be generated, the annular flow may be generated. Thus, the abnormal sound is prevented from being generated.

According to the aforementioned embodiment, the introduction flow passage (88a2) has the inner diameter that is set at the range of 3 millimeter to 4.5 millimeter.

Accordingly, the abnormal sound generated when the exhaust drain valve 55 is opened can be reduced.

According to the aforementioned embodiment, the orifice (88a1) has the inner diameter that is set at the range of 1.4 millimeter to 2 millimeter; and the orifice (88a1) has the length that is set at the range of 10 millimeter to 20 millimeter.

Accordingly, the abnormal sound generated when the exhaust drain valve 55 is opened can be reduced.

According to the aforementioned embodiment, the introduction flow passage (88a2) has the inner diameter that is set at the range of 3.5 millimeter to 3.8 millimeter, the orifice (88a1) has the inner diameter that is set at the range of 1.8 millimeter to 1.9 millimeter, and the orifice (88a1) has the length that is set at 12 millimeter.

Accordingly, the abnormal sound generated when the exhaust drain valve 55 is opened can be reduced.

According to the aforementioned embodiment, the introduction flow passage (88a2) has the diameter that is constant along the entire length of the introduction flow passage (88a2).

Accordingly, the abnormal sound generated when the exhaust drain valve 55 is opened can be reduced.

According to the embodiment, the valve casing is made of resin. Alternatively, for example, the valve casing can be made of aluminum. According to the embodiment, the body portion of the valve casing is made of polyphenylene sulfide resin being filler-reinforced by, for example, glass fiber. Alternatively, a known resin material, for example, a polyether ether ketone (PEEK) is applicable.

According to the embodiment, an attachment member corresponds to the gas-liquid separation device 54. Alternatively, the gas-liquid separation device 54 can be a member or a device that is provided at the pipe positioned between the fuel gas outlet and the dilution device of the fuel cell.

The valve body operation device 84 serves as an electromagnetic solenoid. Alternatively, the valve body operation device 84 can be, for example, a linear motor or an actuator driven by an air pressure or an oil pressure.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An exhaust drain valve for a fuel cell being provided at a position between an exhaust pipe being connected to an outlet of a cathode flow passage of the fuel cell and an outlet of an anode flow passage of the fuel cell, the exhaust drain valve for the fuel cell flowing and shutting off an anode-off gas and a produced water discharged from the anode flow passage, the exhaust drain valve for the fuel cell comprising:
   a valve casing;
   a primary flow passage being provided at the valve casing, the primary flow passage introducing the anode-off gas and the produced water from an inlet of the primary flow passage to an inside;
   a secondary flow passage being provided at the valve casing, the secondary flow passage discharging the anode-off gas and the produced water from an outlet of the secondary flow passage to an outside, the anode-off gas and the produced water introduced from the primary flow passage;
   a valve seat being formed at a primary flow passage outlet, the primary flow passage outlet serving as an outlet of the primary flow passage; and
   a valve body moving forward and backward relative to the valve seat, the valve body being formed with a valve portion selectively attachable to the valve seat; wherein
   the primary flow passage includes
   an orifice being communicated with the primary flow passage outlet;
   an introduction flow passage having a diameter larger than a diameter of the orifice;
   the introduction flow passage being communicable with the inlet; and
   a step portion being formed orthogonal to an axial direction of the introduction flow passage, the step portion connecting the orifice and the introduction flow passage by having a step between the orifice and the introduction flow passage, wherein
   the introduction flow passage has an inner diameter that is set at a range of 3.5 millimeter to 3.8 millimeter;
   the orifice has an inner diameter that is set at a range of 1.8 millimeter to 1.9 millimeter; and
   the orifice has a length that is set at 12 millimeter.

2. The exhaust drain valve for the fuel cell according to claim 1, wherein the primary flow passage is positioned in a lateral manner in a case where the exhaust drain valve for the fuel cell is in a mounted state.

3. The exhaust drain valve for the fuel cell according to claim 1, wherein the introduction flow passage has the diameter that is constant along an entire length of the introduction flow passage.

* * * * *